United States Patent [19]

Hass

[11] 4,123,507

[45] Oct. 31, 1978

[54] PROCESS FOR REMOVING SULFUR AND $NO_x$ COMPONENTS FROM A GAS STREAM

[75] Inventor: Robert H. Hass, Fullerton, Calif.

[73] Assignee: Union Oil Company of California, Los Angeles, Calif.

[21] Appl. No.: 809,285

[22] Filed: Jun. 23, 1977

Related U.S. Application Data

[63] Continuation-in-part of Ser. No. 738,134, Nov. 2, 1976, abandoned, which is a continuation-in-part of Ser. No. 605,638, Aug. 18, 1975.

[51] Int. Cl.² .................. C01B 17/04; B01D 53/34
[52] U.S. Cl. ..................... 423/573 G; 423/239; 423/242; 423/243; 423/244; 423/352; 423/539; 423/564
[58] Field of Search ............... 423/230, 242, 244, 239, 423/573 G, 574 G, 564, 539, 563, 243, 352

[56] References Cited

U.S. PATENT DOCUMENTS

| | | | |
|---|---|---|---|
| 2,083,894 | 6/1937 | Connolly | 423/573 G |
| 3,598,878 | 8/1971 | Kovach et al. | 252/455 Z |
| 3,752,877 | 8/1973 | Beavan | 423/244 |
| 3,794,710 | 2/1974 | Merrill | 423/244X |
| 4,012,488 | 3/1977 | Brocoff | 423/239 X |
| 4,036,943 | 7/1977 | Huron et al. | 423/242 X |
| 4,039,621 | 8/1977 | Costantini | 423/239 |
| 4,048,293 | 9/1977 | Renault et al. | 423/242 X |

Primary Examiner—Earl C. Thomas
Attorney, Agent, or Firm—Gregory F. Wirzbicki; Lannas S. Henderson; Richard C. Hartman

[57] ABSTRACT

A feed gas containing one or more components selected from the class consisting of $H_2S$, $SO_2$, $SO_3$, COS, $CS_2$, light mercaptans, and sulfur vapor is desulfurized by (a) hydrogenating and hydrolyzing essentially all non-$H_2S$ sulfur components to $H_2S$, (b) oxidizing most of the $H_2S$ in the resulting product gas to sulfur, and removing the latter by condensation, (c) oxidizing the residual $H_2S$ to $SO_2$, (d) absorbing essentially all the $SO_2$ in an aqueous ammonia solution, (e) passing a portion of the $SO_2$-containing ammonia solution to step (a), and (f) discharging from step (d) a purified product gas essentially free of sulfur components.

A feed gas, such as a stack gas, which contains only $SO_2$ and $SO_3$ components to be removed therefrom, may be treated in alternative embodiments of the invention involving the passage of all or a major proportion of the feed gas directly to absorption step (d).

In all embodiments of the invention a substantial proportion of $NO_x$ components, if present in the feed gas, is also removed.

25 Claims, 1 Drawing Figure

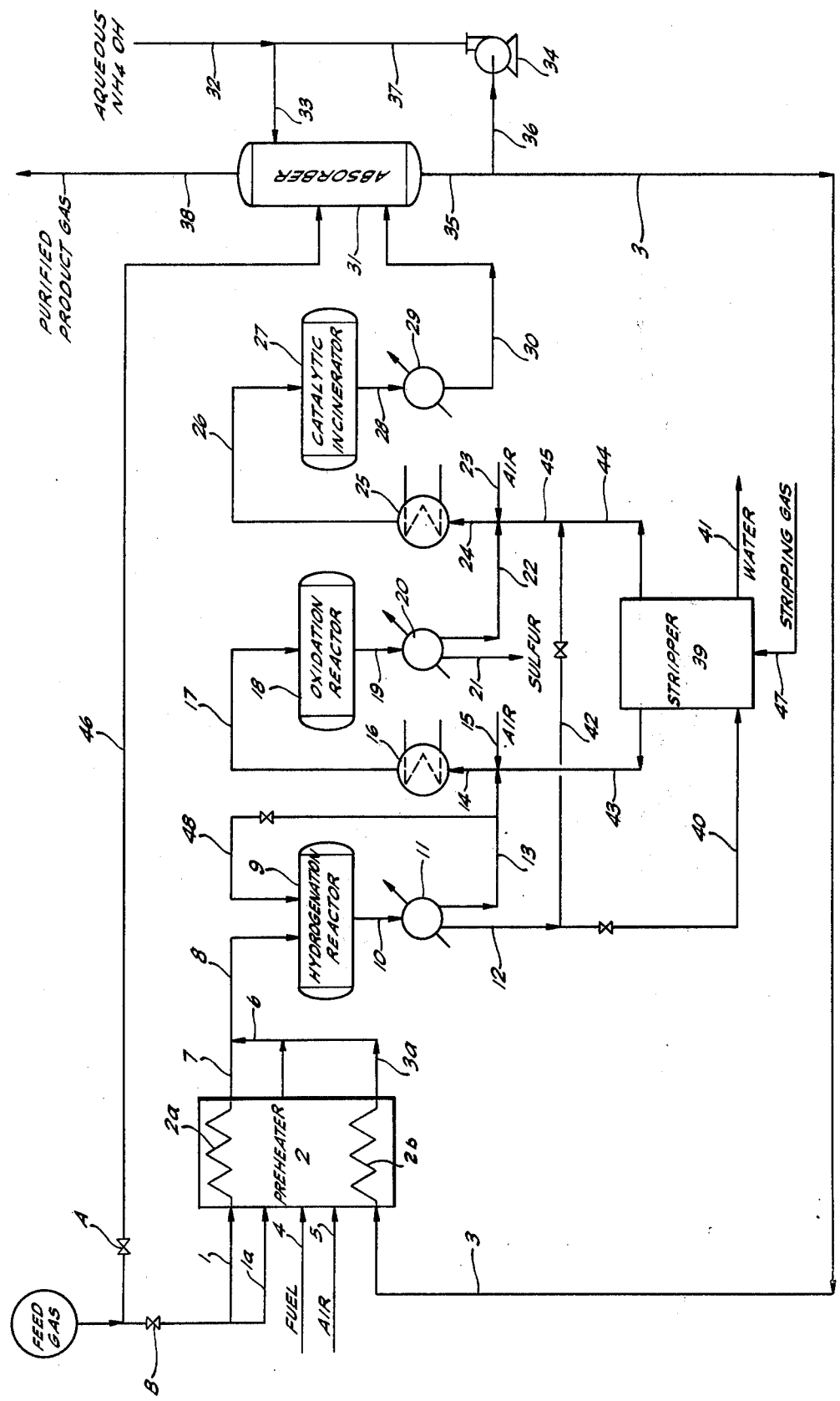

PROCESS FOR REMOVING SULFUR AND NO$_x$ COMPONENTS FROM A GAS STREAM

CROSS REFERENCE TO RELATED APPLICATIONS

This is a continuation-in-part of copending application Ser. No. 738,134, filed Nov. 2, 1976, and now abandoned, which is itself a continuation-in-part of Ser. No. 605,638, filed Aug. 18, 1975.

BACKGROUND OF THE INVENTION

This invention relates to the desulfurization of gases to obtain an essentially completely desulfurized product gas suitable for discharge into the atmosphere. It especially relates to the desulfurization of stack gases and Claus plant tail gases.

Most Federal and State environmental regulations restrict the amount of sulfur components which may be discharged to the atmosphere. In California, for example, waste gases containing more than 10 ppmv H$_2$S or more than 500 ppmv of total sulfur compounds (calculated as SO$_2$) may not be so discharged.

To meet such stringent requirements, two processes are presently being used commercially to treat feed gases containing several sulfur components, e.g., Claus tail gases. In both processes, the feed gas is first passed, as more thoroughly described in U.S. Pat. No. 3,752,877, through a cobalt-molybdate catalyst bed in the presence of H$_2$ and/or CO to convert essentially all sulfur components to H$_2$S by hydrogenation and hydrolysis. The H$_2$S-containing gas thus obtained is then treated in either of two general ways. In one, the gas is passed through a solution comprising a sodium vanadate, sodium carbonate, sodium bicarbonate, and a chelating agent so as to convert the H$_2$S to liquid sulfur. Alternatively, the H$_2$S-containing gas may be passed through an absorbent comprising alkanolamines, whereby the H$_2$S is selectively absorbed. The rich absorbent containing dissolved H$_2$S is stripped and sent to a Claus plant, and the lean absorbent is recycled back to the absorber.

In both of the aforementioned processes, desulfurization is usually better than 95% complete. However, each has disadvantages. Using a solution of sodium vanadates for the conversion of H$_2$S to sulfur results in the concentration of thiosulfate ion therein, and, when the concentration reaches about 20 wt.%, the entire solution must be discarded, thereby resulting not only in the loss of expensive chemicals but also in the creation of a waste disposal problem. Using alkanolamines as an H$_2$S-absorbing medium also has disadvantages. Such absorbents are usually not as efficient as the solution of sodium vanadates for removing H$_2$S; moreover, the product gas withdrawn from the absorbent normally contains H$_2$S in concentrations higher than the 10 ppmv limit set by California regulations. Hence, this product gas must usually be thermally incinerated to convert the residual H$_2$S to SO$_2$, a process which not only entails the consumption of fuel but also involves a substantial capital investment.

Other difficulties confront those attempting to desulfurize stack gas from power plants and the like. Such gases usually contain about 0.1–20 mol % of sulfur components, mostly in the form of SO$_2$. To remove SO$_2$ from such gases completely in the gas phase generally involves reduction of the SO$_2$, usually to H$_2$S and then to elemental sulfur. Since this reduction cannot be accomplished in the presence of oxygen, which comprises 2–5 mol % of stack gases, it is usually necessary to consume all the oxygen in the stack gas with a fuel. But because stack gases are normally discharged at high volumetric rates, the fuel required to deplete the oxygen therein must be fed at a rate which is uneconomically high.

SUMMARY OF THE INVENTION

In accordance with this invention feed gas streams containing one or more components selected from the class consisting of H$_2$S, SO$_2$, SO$_3$, CS$_2$, COS, light mercaptans, and sulfur vapor are desulfurized by (a) hydrogenating and/or hydrolyzing at least 80% of all non-H$_2$S sulfur components to H$_2$S; (b) oxidizing in excess of 50% of the H$_2$S in the product gas obtained from step (a) to sulfur in the gas phase by contacting said product gas plus an oxidant comprising oxygen and/or SO$_2$ with a solid catalyst active for the oxidation of H$_2$S to sulfur; (c) separating at least some of the sulfur produced in step (b) from the remaining off-gas; (d) incinerating at least 90% of the residual H$_2$S in said off-gas to SO$_2$; (e) absorbing essentially all of the SO$_2$ in the SO$_2$-containing gas removed from step (d) in an aqueous solution comprising a component selected from the class consisting of ammonia, ammonium compounds, soluble amines, and combinations thereof, said solution preferably being essentially completely vaporizable at some temperature less than 800° F.; (f) vaporizing a bleed stream of said aqueous solution and blending the vaporized stream with the feed gas entering step (a); and (g) discharging from step (e) a purified product gas stream, the mass flow rate of sulfur components (as sulfur) carried therein being less than 10% of the mass flow rate of the sulfur components carried in the feed gas.

If the feed gas contains SO$_2$ and/or SO$_3$ as the only sulfur components to be removed therefrom (e.g., an industrial stack gas), all or a major portion of the feed gas may be fed directly to the absorbing step (e). Inherent advantages in this embodiment include the use of small-sized equipment in steps (a) through (d) and the necessity of removing oxygen, if at all, from only a minor portion of the feed gas stream.

In both embodiments of the invention a substantial proportion of NO$_x$ components, if present in the feed gas, are removed by conversion to ammonia, with ammonia yields exceeding at least 50%. Hence, the invention is advantageously employed when stack gases and the like must be treated, because both NO$_x$ and SO$_x$ components therein are concomitantly removed.

Except for water vapor itself, all concentrations of gaseous components herein are expressed on a dry basis. All space velocity data are reported in terms of volumes of gas calculated at one atmosphere and 60° F. passing through one volume of catalyst per hour. Also, the terms "light mercaptans" and "light hydrocarbons" as used herein refer to those mercaptans and hydrocarbons, respectively, that contain no more than 6 carbon atoms. As used herein, the mass flow rate of sulfur components is a measurement of the mass flow rate of sulfur in the gas stream under consideration, whether said sulfur is present in elemental or combined forms. Similarly, the mass flow rate of NO$_x$ components is a measurement of the mass flow rate of NO$_x$ as nitrogen in the gas stream under consideration. Lastly, as used herein, the term NO$_x$ embraces all gaseous nitrogen oxides having N/O atomic ratios between 0.5 and 2.0, such as NO, NO$_2$, N$_2$O$_4$, N$_2$O, and N$_2$O$_3$.

BRIEF DESCRIPTION OF DRAWING

The drawing shows in schematic form the preferred embodiments of the invention for treating a feed gas containing sulfur components in general, or, alternatively, a feed gas from which the only sulfur components to be removed are $SO_2$ and/or $SO_3$. $NO_x$ components may be present in the feed gas stream of all embodiments.

DETAILED DESCRIPTION OF THE INVENTION

The feed gas may contain between about 0.001 and 20.0 vol.% of sulfur components, usually between about 0.1 and 20.0 vol.%, and preferably between about 0.5 and 5.0 vol.% of sulfur components. $NO_x$ components may be present in concentrations between about 0.001 and 20.0 vol.%, usually between about 0.001 and 1.0 vol.%. The bulk of the remaining feed gas components usually comprises one or more of nitrogen, carbon dioxide, methane, hydrogen, and water vapor. Preferably, the feed gas should contain no more than about 50 vol.% of water vapor, and, if it contains more than about 0.1 mol % oxygen, the same should be removed (preferably in the manner to be described hereinafter) from that portion of the gas stream passing through reactor 9 to prevent the deactivation of the hydrogenation catalyst therein. The feed gas should also preferably be essentially free of solid particulates.

Referring now to the drawing, the process will be described first with respect to its most universal application, which is effective for the removal of any or all of the aforementioned sulfur and $NO_x$ components. For this operation, valve A is closed and valve B is open, thereby permitting the feed gas to be introduced into the system via line 1 or 1a. The feed gas passes into preheater 2 at any convenient temperature from ambient to about 800° F. and at any convenient pressure from 5 to about 100 psia, preferably 15–20 psia, which pressure will substantially prevail throughout the process. If the feed gas is a Claus plant tail gas, or other feed gas containing less than 0.1 mol % oxygen, then it is fed via line 1 into preheater 2 wherein it is heated indirectly by passage through coil 2a; if the feed gas contains more than 0.1 mol % oxygen, at least a portion thereof is preferably fed via line 1a into preheater 2 to be heated directly. Also fed into preheater 2 are a fuel gas introduced through line 4 and an aqueous recycle stream containing dissolved ammonia and sulfur compounds, mostly as $SO_2$, introduced via line 3. The fuel gas is burned in preheater 2 under net reducing conditions with oxygen or air supplied via line 5 and/or oxygen present in the feed gas introduced through line 1a so as to vaporize into line 3a the liquid stream entering from line 3 and produce a flue gas stream in line 6 containing hydrogen and/or carbon monoxide but essentially no oxygen.

The flue gas stream in line 6 is combined with the indirectly heated feed gas stream leaving preheater 2 through line 7 to produce a mixed gas stream at a temperature in the range of 300°–800° F., preferably in the range 600°–700° F., in line 8. This mixed gas stream preferably contains 1.5–2.5 times the stoichiometric amount of $H_2$ and/or CO necessary to hydrogenate the $SO_2$, $SO_3$, sulfur vapor, and light mercaptan components therein to $H_2S$ according to the following representative reactions:

$$CO + H_2O \rightleftarrows CO_2 + H_2 \quad \text{(I)}$$

$$SO_2 + 3H_2 \rightarrow H_2S + 2H_2O \quad \text{(II)}$$

$$S + H_2 \rightarrow H_2S \quad \text{(III)}$$

$$SO_3 + 4H_2 \rightarrow H_2S + 3H_2O \quad \text{(IV)}$$

$$CH_3SH + H_2 \rightarrow CH_4 + H_2S \quad \text{(V)}$$

The mixed gas stream will also contain a substantial portion of water vapor comprising that produced by vaporization of the aqueous recycle stream and that produced by combustion of the fuel and/or feed gases. In addition, the feed gas itself may contain a substantial proportion of water vapor. In any event, sufficient water vapor must be present in the mixed gas stream for the hydrolysis of CO according to Reaction I as well as for the hydrolyses of $CS_2$ and COS according to:

$$CS_2 + 2H_2O \rightleftarrows CO_2 + 2H_2S \quad \text{(VI)}$$

$$COS + H_2O \rightleftarrows CO_2 + H_2S \quad \text{(VII)}$$

Preferably, at least 1.5 times the stoichiometric amount of water vapor necessary for Reactions I, VI, and VII is present. If necessary, steam may be blended with the feed gas prior to its introduction into preheater 2 to provide the required amount of water vapor.

Within reactor 9, the mixed gas stream is contacted with a hydrofining catalyst at a preferred space velocity of about 1500 to 4000 v/v/hr. The catalyst may be any prereduced sulfactive hydrofining catalyst comprising one or more of the Group VIB metal oxides and/or sulfides and one or more iron group metal oxides and/or sulfides, with preferred catalysts comprising cobalt or nickel oxides and/or sulfides and molybdenum or tungsten oxides and/or sulfides. The most especially preferred catalyst, however, comprises a presulfided, sulfactive cobalt molybdate hydrofining catalyst, and is preferably composed of about 3–8 wt.% cobalt oxide (CoO) and about 8–20 wt.% molybdenum oxide ($MoO_3$) in presulfided reduced form on a refractory oxide support such as alumina. These catalysts are very effective for producing $H_2$ according to Reaction I and for producing $H_2S$ according to Reactions II through VII. The equilibria of these reactions in the preferred temperature range of 600° to 800° F. are such that more than 80%, usually more than 95%, and sometimes virtually 100%, of the non-$H_2S$ sulfur components passing through reactor 9 are converted to $H_2S$. In the temperature range of 300° to 600° F., similar overall high conversions of non-$H_2S$ sulfur components to $H_2S$ are obtainable if the mixed gas stream contains COS, $CS_2$, and mercaptans in a total volume concentration (as monatomic sulfur) less than about 5% of the total concentration of the non-$H_2S$ sulfur components.

It is also noted that the catalysts utilized in hydrogenation reactor 9 should, under steady state conditions, be in the sulfide form, i.e., the metallic components on the catalyst should be predominantly in the sulfide state. Normally, because the mixed gas stream in line 8 usually contains more than about 0.1 mol % $H_2S$ and/or sulfur vapor, the catalyst will inherently be maintained in the sulfided condition. If the mixed gas stream does not contain $H_2S$ and/or sulfur vapor, however, a stream of $H_2S$-containing gas should be blended into the mixed gas stream, as by recycling by line 48 a portion of the product gas stream obtained from hydrogenation reactor 9 into said mixed gas stream.

If the mixed gas stream contains $NO_x$ components in addition to sulfur components, such $NO_x$ components will also be hydrogenated in hydrogenation reactor 9 under the conditions hereinbefore specified according to the following reaction:

$$2NO_x + (3+2x)H_2 \rightarrow 2NH_3 + 2xH_2O \qquad (VIII)$$

provided sufficient $H_2$ and/or $CO$ plus $H_2O$ reactants are available for Reactions I through VIII. Moreover, because the mixed gas stream in the preferred embodiment of the invention contains ammonia gas from the aqueous stream in line 3, it is noted that some $NO_x$ components in reactor 9 are removed according to:

$$6 NO_x + 4xNH_3 \rightarrow (2x+3) N_2 + 6x H_2O \qquad (IX)$$

Usually, however, no more than about 10% of the $NO_x$ components will be converted to nitrogen according to Reaction IX. This is considered surprising inasmuch as thermodynamic calculations predict that, at equilibrium, essentially all $NO_x$ components would be converted to nitrogen via Reaction IX.

After leaving hydrogenation reactor 9 through line 10, the product gas stream containing $H_2S$ as substantially the only sulfur component therein, but containing essentially no $NO_x$ components, is cooled in condenser-separator 11 to remove water via line 12. Water may be eliminated from the product gas in any manner, including by adsorption on desiccants, but it is important at this point to remove as much water as is economically possible. The conversion of $H_2S$ to sulfur in the gas phase, as will occur subsequently in oxidation reactor 18, is equilibrium limited, being thermodynamically dependent upon the concentration of water vapor in the product gas. As the water vapor concentration decreases, the amount of sulfur formed increases, with conversions of $H_2S$ to sulfur varying up to 95% complete. Thus, unless the gases leaving hydrogenation reactor 9 are inherently low in water vapor concentration, it is preferred that the product gas be cooled to about 50°–130° F. to condense sufficient water to yield a dehydrated product gas containing less than about 15%, preferably less than about 10%, by volume of water vapor, so that in excess of 50%, preferably between 70% and 90%, of the $H_2S$ can be converted to sulfur.

The product gas, dehydrated for example to a water vapor dew point in the range of 100°–130° F., which is usually about all that can be economically obtained at present by condensation, is passed by line 13 to line 14 to be mixed therein with an oxidant preferably consisting of air or free oxygen introduced from line 15. It is highly desirable in carrying out the subsequent conversion of $H_2S$ to sulfur in oxidation reactor 18 that the air or oxygen supplied via line 15 be such that the resultant mixture of gases in line 14 contains only the stoichiometric amount of oxygen required by the overall reaction:

$$2H_2S + O_2 \rightarrow 2S + 2H_2O \qquad (X)$$

to effect the conversion of all the $H_2S$ in the mixture to sulfur. As is well known, the use of oxygen in amounts substantially below or above that necessary for Reaction X generally results in poorer conversions of $H_2S$ to sulfur in the gas phase than when the stoichiometric amount is used. This is due primarily to the fact that the formation of at least some sulfur dioxide is produced by:

$$2H_2S + 3O_2 \rightarrow 2SO_2 + 2H_2O \qquad (XI)$$

which then reacts with $H_2S$ by the equilibrium limited reaction:

$$2H_2S + SO_2 \rightleftharpoons 3S + 2H_2O \qquad (XII)$$

But if an excess or a deficiency of oxygen is available, either an overproduction or an underproduction of $SO_2$ via Reaction XI occurs, and the overall conversion of $H_2S$ to sulfur via Reaction X decreases. Thus, although the use of oxygen in amounts other than the stoichiometric amount required for Reaction X may be found feasible or utilitarian in some instances, it is recommended that oxygen, preferably in the form of air, be supplied in substantially the exact stoichiometric amount required by Reaction X.

Other oxidants that may be fed via line 15 include those comprising free oxygen and/or $SO_2$, the latter producing sulfur exclusively by Reaction XII. These oxidants should also be utilized only in the stoichiometric amounts necessary to produce sulfur. Thus, gases comprising oxygen and/or $SO_2$ should be added such that the gas mixture in line 14 contains $O_2$ and/or $SO_2$ in a molar ratio with $H_2S$ substantially equal to 0.5, i.e. $(O_2 + SO_2)/H_2S = 0.5$.

The mixture of gases in line 14 is heated in preheater 16 to a temperature of at least about 250° F., preferably between about 300° and 450° F. It is then fed via line 17 into oxidation reactor 18 and passed through a bed of catalyst therein at a space velocity between about 250 and 2000 v/v/hr, preferably between about 800 and 1000 v/v/hr. The catalyst in reactor 18 may be any of those conventionally known in the art which, in solid form, are active for the conversion of $H_2S$ to sulfur with oxygen or $SO_2$ or both, as the case may be, under conditions selected from those just described. Generally speaking, many catalysts are known in the art for oxidizing $H_2S$ to sulfur with $SO_2$, especially when the reaction is carried out at higher temperatures (i.e., 450°–900° F.). However, since air is a preferred and the most conveniently available oxidant, it is preferred that a catalyst highly active for the oxidation of $H_2S$ to sulfur with oxygen be utilized.

One such catalyst comprises a vanadium oxide and/or sulfide supported on a non-alkaline, porous refractory oxide. This catalyst, described in fuller detail hereinafter, is highly active for the conversion of $H_2S$ to elemental sulfur via overall Reaction X, even at temperatures of 250°–450° F. When operating with such a catalyst within this temperature range, and with a hydrogenated product gas dehydrated to a dew point of about 100°–130° F., 70 to 90% conversions of $H_2S$ to sulfur are easily achieved even at high space velocities. Furthermore, because this catalyst is selective for the oxidation of $H_2S$, such oxidizable components as $H_2$, $CO$, $NH_3$, and light hydrocarbons, all of which may be present in the dehydrated product gas stream, remain essentially completely unoxidized, thereby eliminating the unnecessary generation of heat.

When conditions are selected from among those hereinbefore given so as to insure that the sulfur produced in oxidation reactor 18 does not condense on the catalyst therein, the gases leaving said oxidation reactor 18 via line 19 will contain essentially all of said produced sulfur in the vapor state. This sulfur vapor is condensed at about 250°–270° F. in condenser-separator 20 wherefrom molten sulfur is discharged via line 21. The amount of sulfur condensed is in excess of 50% by weight of all sulfur components (as sulfur) removed from oxidation reactor 18 via line 19.

Also discharged from condenser-separator 20 are off-gases in line 22 containing residual $H_2S$, $SO_2$, and sulfur vapor. These off-gases are blended with excess oxygen or air introduced from line 23 for the conversion of said residual $H_2S$ and sulfur vapor to $SO_2$ via Reaction XI and the following Reaction XIII:

$$S + O_2 \rightarrow SO_2 \qquad \text{(XIII)}$$

Preferably, the resulting gaseous mixture passing through line 24 contains sufficient oxygen such that, when all the oxygen available in line 24 reacts with the residual $H_2S$ and sulfur vapor, the resulting $SO_2$ containing gas stream contains no more than 1.0 mole percent, and most preferably no more than 0.5 mole percent, of oxygen.

The gaseous mixture in line 24 is passed to preheater 25 wherein it is heated to a temperature of at least 300° F., preferably between 600° and 900° F. The preheated gas then passes via line 26 to incinerator 27 wherein it is contacted with a catalyst active for the conversions of $H_2S$ and sulfur vapor to $SO_2$ at a space velocity between 1000 and 100,000 v/v/hour, preferably between 2000 and 20,000 v/v/hour. Many catalysts known in the art are sufficiently active for these conversions. The preferred catalyst, however, is the same as that used in oxidation reactor 18, i.e., one comprising a vanadium oxide and/or sulfide supported on a non-alkaline porous refractory oxide. This catalyst, when contacted with $H_2S$ and excess oxygen (for Reactions XI and XIII) at temperatures in excess of 300° F., is highly active for the conversion of $H_2S$ to $SO_2$, with conversions in excess of 90%, usually in excess of 95%, being readily obtainable. Similar conversions of residual sulfur to $SO_2$ are obtainable. Moreover, the catalyst utilized in incinerator 27 is so selective for the oxidation of $H_2S$ that any such highly oxidizable components as $H_2$, $CO$, $NH_3$, and light hydrocarbons which may be present remain almost completely unoxidized, thus greatly reducing the amount of heat generated. Also, when incinerator 27 contains a preferred vanadia catalyst, no $SO_3$ will be produced therein, provided the gas stream in line 24 contains in excess of 0.5 mole % hydrogen or the temperature maintained in said incinerator 27 is less than 600° F.

Following incineration, the $SO_2$-containing gases are removed via line 28, cooled to below about 200° F. in heat exchanger 29, and then passed to $SO_2$ absorber 31 via line 30. Absorber 31 is conventional, comprising means for adding make-up absorber solution via lines 32 and 33, and for recycling said solution through the absorber via pump 34 and lines 35, 36, 37, and 33. Temperatures are maintained at between about 50° and 200° F. The absorbent is preferably one consisting essentially of components that are vaporizable at some temperature between about 200° and 800° F. The preferred aqueous absorbent comprises dissolved ammonia; however, ammonium compounds, amines, or combinations thereof, dissolved in deionized water may also be utilized. Such aqueous solutions, especially when maintained in absorber 31 at a pH of at least 3.0, preferably at least 6.0, and most economically between 6.0 –6.6, are highly effective for absorbing $SO_2$ (i.e., by dissolution and/or chemical reactions), and the purified product gas discharged from absorber 31 via line 38 will contain only trace concentrations of sulfur components. On a weight per hour basis, the amount of sulfur components (as sulfur) discharged via line 38 will be less than 10%, usually less than 5%, and most usually less than 2%, of the amount fed as sulfur components in the feed gas. In addition, these sulfur components will consist essentially of $SO_2$, over which there are generally less stringent requirements on discharge to the atmosphere than $H_2S$, $SO_3$, etc.

Absorber 31 is also provided with means for removing, on a continuous weight per hour basis, as much dissolved $SO_2$ as enters the absorber from the incinerator 27. This is accomplished by bleeding a portion of the absorbent via line 3 to coil 2b, wherein said bleedstream is vaporized for intimate commingling with other gases in line 8. Hence, essentially all of the residual $H_2S$, sulfur vapor, and $SO_2$ contained in the off-gases in line 22 are ultimately recycled in the form of dissolved $SO_2$, or easily decomposed sulfite salts, to hydrogenation reactor 9, thereby preventing the atmospheric discharge of these residual sulfur components. Moreover, since the preferred absorbent contains no components that leave a solid residue when said absorbent is vaporized at some operable temperature for hydrogenation reactor 9 (i.e., 300°–800° F.), the operating temperature in said reactor 9 is preferably selected so as to prevent the deposition of deactivating solids on the catalyst contained therein.

Means are also provided in the invention for treating the foul water containing dissolved $H_2S$ and $NH_3$ removed through line 12. In one embodiment especially useful for treating feed gases containing less than 30 mol % water vapor, preferably less than 15 mol % water vapor, the foul water is simply directed by lines 42 and 45 to be blended by spray atomization with the gases entering preheater 25. In such embodiment, preheater 25 must be sized so as to vaporize the foul water and heat the combined gases to the temperatures hereinbefore described. In addition, since the only means in such embodiment for removing water from the system is by vaporization in absorber 31, the absorbent in absorber 31 is maintained at a sufficient temperature between about 50° and 200° F. such that, on a continuous weight per hour basis, the amount of water entering the absorber is equally balanced by the amount of water removed as a liquid via line 3 and as a vapor via line 38.

In a more preferred embodiment, the foul water is sent to a stripping unit 39 in order to avoid vaporizing water in preheater 25. In this embodiment the foul water contained in line 12 is directed to the stripping unit by line 40 so that dissolved gases (mostly $H_2S$ and $NH_3$) are removed therefrom by means of a stripping gas from line 47 and stripped water is obtained via line 41. The overhead gases from the stripper are then sent either to preheater 16 via line 43 or to preheater 25 via lines 44 and 45, depending upon the nature of the gas used to strip the dissolved gases. If air or, more preferably, steam is used, the overhead gases should be blended with the gases entering preheater 25. If nitrogen, carbon dioxide, or other gas containing essentially no steam or free oxygen is used, the overhead gases may be blended with the gases entering preheater 16. In either case, the feed rate of air through line 15 or 23 should be increased to insure that sufficient oxygen is available in the gases passing through preheater 16 or 25 such that all the $H_2S$ in such gases, including that amount added by the blending of gases from line 43 or 45, may be converted to sulfur or $SO_2$ as required.

It will thus be seen that, in the preferred embodiment of the invention as described, the only products of the process are sulfur in line 21, water in line 41 (if a stripping unit is utilized), and a purified product gas in line 38. The only chemical costs of the process are those related to the fuel added via line 4 and the aqueous ammonia added via line 32, both of which are at least partially offset by the value of the sulfur by-product obtained in line 21. Moreover, the amount of ammonia added via line 32 will be relatively small, because nearly all the ammonia removed via line 3 from absorber 31 ultimately returns to said absorber 31 as a component of the $SO_2$-containing gases carried in line 28. What loss there is of ammonia in the overall process is due to the formation of small amounts of ammonium sulfate in absorber 31, which ammonium sulfate must be decomposed in coil 2b above about 1300° F., presumably by:

$$3(NH_4)_2SO_4 \rightarrow 4NH_3 + 3SO_2 + 6H_2O + N_2 \qquad (XIV)$$

in order to avoid any deposition of solid ammonium sulfate in lines 3a, 6, and 8. But provided the ammonium sulfate formation is minimized in absorber 31, as by preventing the formation of $SO_3$ in incinerator 27 as shown hereinbefore and controlling the oxygen content of the $SO_2$-containing gases in line 30 as shown hereinafter, the amount of ammonia added via line 32 will be negligible. This result is due to the non-oxidation of ammonia in oxidation reactor 18 and incinerator 27 and the fact more ammonia is produced in hydrogenation reactor 9 via Reaction VIII than is lost via Reaction IX. Moreover, under some circumstances, such as when the $NO_x$ concentration in the feed gas is high and ammonium sulfate formation in absorber 31 is low, more ammonia is produced in hydrogenation reactor 9 than is lost in the overall process. As a result, an overproduction occurs, and ammonia must be recovered from the process, as by withdrawing liquid through line 32 rather than adding it.

The following Example is illustrative of the embodiment of the invention just described.

EXAMPLE I

The following experiment was performed over a 10 day period. The results shown in Table I and Table II were derived from samples obtained at the 206th hour of the run. All feed rates, pressures, temperatures, etc. given in this Example I indicate the conditions prevailing at the 206th hour of the run; however, in the course of the experiment, some of the operating conditions were varied to a minor extent from those shown herein.

A mixture of a simulated Claus plant tail gas containing about 33 mol % water vapor and a reducing gas comprising $H_2$ and CO had a composition as shown in column 1, Table I. (The water was introduced into the mixture by vaporization at a rate of 0.10 ml/min.) This mixture was blended at a rate of 405.9 scc/min (measured at 60° F. and 1 atm.) with a vaporized stream of an aqueous solution containing dissolved $SO_2$ and $NH_3$ removed from an absorber hereinafter described. The blend was then fed at a gauge pressure of 4.0 inches of water and at a rate of 554.3 scc/min (2,730 v/v/hr) into a hydrogenation reactor containing 12.18 cc (6.917 gm) of a catalyst consisting of 6 wt.% CoO, 12 wt.% $MoO_3$, and 82% $Al_2O_3$. The operating temperature of the hydrogenation reactor was maintained isothermally at 700° F. A hydrogenated gas stream having the dry composition shown in column 2, Table I, was recovered. This hydrogenated gas was cooled to room temperature (73° F.) to remove sour condensate water at a rate of about 0.20 ml/min, and then blended with a stoichiometric amount of air (for Reaction X) fed at a blending rate of 11.36 scc/min. The resulting mixture was then fed at a space velocity of 1000 v/v/hr through an oxidation reactor containing 16.00 cc (8.00 gm) of a catalyst consisting of 10 wt.% $V_2O_5$ and 90 wt.% silica-alumina, said silica-alumina consisting of $SiO_2$ and $Al_2O_3$ in a weight-ratio of 3:1, $SiO_2$:$Al_2O_3$. The operating temperature of the oxidation reactor was maintained at 450° F. by suitable means. The gas stream obtained from said oxidation reactor was cooled to 260° F. to remove most of the sulfur vapor contained therein by condensation. The remaining off-gases having a composition as shown in column 3, Table I, were then blended with excess air (for Reaction XI) fed at a blending rate of 8.6 scc/min. The resulting mixture was then passed at a space velocity of 4000 v/v/hr through a catalytic incinerator containing 4.00 cc (2.759 gm) of a catalyst consisting of 10 wt.% $V_2O_5$, 80 wt.% hydrogen mordenite, and 10 wt.% silica. The operating temperature of the incinerator was maintained at 700° F. The treated gases obtained from said catalytic incinerator had a composition as shown in column 4, Table I. They were passed at a pressure of 0.375 in. of water to an absorber now to be described wherefrom a purified product gas having a composition shown in column 5, Table I was withdrawn at a rate of about 271.5 scc/min.

The absorber into which the treated gases were passed had a liquid volume capacity of 150 cc. The absorber solution was aqueous ammonia made up from a source of a 0.6 N ammonium hydroxide solution. The solution in the absorber itself was maintained at a pH of 6.0–6.5 and a temperature of 80–85° F. The makeup solution was fed at 0.11 ml/min, the recycle rate of liquid through the absorber was about 126 ml/min, and the liquid bleed stream, which was subsequently vaporized and blended with the gases entering the hydrogenation reactor, was removed from said absorber at a rate of 0.11 ml/min.

The compositions of the recycle bleed stream and the sour water condensate are shown in Table II.

TABLE I[1,2]

| Component | (1) Claus Tail Gas-Reducing Gas Mixture | (2) Hydrogenated Gas | (3) Oxidation Reactor Product | (4) 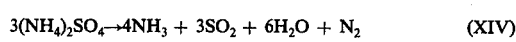 ator Product | (5) Absorber Product Gas |
|---|---|---|---|---|---|
| $O_2$, mol % | 0.01 | 0.02 | 0.02 | 0.14 | 0.14 |
| $N_2$, mol % | 90.15 | 90.40 | 91.63 | 91.90 | 92.34 |
| $CO_2$, mol % | 4.56 | 6.09 | 5.84 | 5.83 | 5.88 |
| $H_2$, mol % | 2.62 | 1.67 | 2.14 | 1.54 | 1.55 |
| CO, mol % | 1.27 | 0.0 | 0.0 | 0.0 | 0.0 |
| $CH_4$, ppmv | 139 | 152 | 162 | 162 | 146 |
| $H_2S$, ppmv | 8038 | 17931 | 2337 | 6 | 0 |

TABLE I[1,2]-continued

|  | (1) | (2) | (3) | (4) | (5) |
|---|---|---|---|---|---|
| Component | Claus Tail Oxidation Gas-Reducing Gas Mixture | Hydrogenated Gas | Reactor Product | Absorber Product | Absorber Product Gas |
| Ar, ppmv | 16 | 19 | 438 | 742 | 734 |
| $CH_3SH$, ppmv | 0 | 0 | 1 | 1 | 1 |
| COS, ppmv | 624 | 34 | 58 | 65 | 56 |
| $SO_2$, ppmv | 4407 | 8 | 813 | 4946 | 9 |
| $CS_2$, ppmv | 753 | 2 | 0 | 2 | 0 |
| S, ppmv as monatomic sulfur | 0 | 0 | 1813 | 0 | 0 |
| Total Sulfur Components as monatomic S, ppmv | 14575 | 17977[3] | 5022 | 5022 | 66 |
| Total Sulfur Compounds as monatomic S, ppmv | 14575 | 17977 | 3209 | 5022 | 66 |

[1] All data reported as the dry composition of the respective gases; the water vapor contents of the gases shown in columns (1) and (5) were about 33 mol % and 3.5 mole %, respectively.
[2] All data except that shown for CO and S vapor obtained by mass spectrometrical techniques. CO data obtained by gas chromatographical techniques. Sulfur data, sulfur components data, and sulfur compounds data obtained by calculation.
[3] The increase in sulfur components in the hydrogenated gas is due to the blending of the bleed stream containing $SO_2$ with the mixture shown in column (1).

TABLE II

|  | Sour Water Condensate Produced Subsequent to Hydrogenation | Liquid Bleed Stream Recycled to Hydrogenation Reactor |
|---|---|---|
| $NH_3$, g/l | 4.04 | 8.96 |
| $H_2S$, g/l | 1.97 | — |
| $SO_2$, g/l | — | 21.8 |
| pH | 8.72 | 6.13 |

The above data indicate the following. The conversion of non-$H_2S$ components to $H_2S$ in the hydrogenation reactor was in excess of 99% complete. The conversion of $H_2S$ to sulfur in the oxidation reactor was in excess of 80% complete. The conversion of $H_2S$ to $SO_2$ in the incinerator, as measured by the disappearance of $H_2S$, was in excess of 99% complete. Overall desulfurization, on a weight per hour basis, was 99.55%, based on 0.315 gm of sulfur components (as sulfur) entering in the feed gas per hour and on 0.0014 gm of sulfur components being discharged as components of the purified product gas per hour.

In addition, it should be noted that the concentration of $H_2S$ discharged with the purified product gas was 0 ppmv. Throughout the experiment, the concentration of $H_2S$ in the product gas ranged between about 0 and 2 ppmv. This represents, on a weight per hour basis, the ultimate discharge of less than 0.02% of the sulfur components in the feed gas as $H_2S$ in the purified product gas. Hence, it is a specific embodiment of the invention to desulfurize a feed gas, especially those containing no more than 5 vol.% of sulfur components, such that the mass flow rate of gaseous sulfur components (as sulfur) being discharged as components of the purified product gas, and the mass flow rate of the $H_2S$ (as sulfur) therein, are less than 5% and 0.1%, respectively, of the mass flow rate of the sulfur components carried as components of the feed gas stream.

It should also be noted that, in the preferred embodiment of the invention hereinbefore described and exemplified in Example I, it is critical that oxygen in the various gas streams be controlled. As stated hereinbefore, a gas stream containing more than about 0.1 mol % oxygen may not be fed to hydrogenation reactor 9; otherwise deactivation of the catalyst therein will occur. However, it is also important to control the amount of oxygen fed via lines 15 and 23. If the gas stream entering the absorber 31 via line 30 contains more than about 1.0 mol % oxygen, then some ammonium sulfate will form in the absorber, even if the only sulfur component in the gases in line 30 is $SO_2$. Since the decomposition and reduction temperature of ammonium sulfate via Reaction XIV is above about 1300° F., it will be necessary to waste more heat energy in preheater 2 to completely vaporize an ammonium sulfate-containing liquid stream removed from absorber 31 via line 3 than to vaporized an ammonium sulfate-free liquid stream. Moreover, as stated hereinbefore, the decomposition of ammonium sulfate in preheater 2 according to Reaction XIV is an unnecessary consumption of ammonia. Hence, although in non-preferred embodiments the oxygen concentration in the $SO_2$-containing gas stream in line 30 may be as high as desired, it is preferred that this oxygen concentration be cntrolled at less than 1.0 mol %.

EXAMPLE II

To demonstrate that $NO_x$-free product gases are obtainable by contacting $NO_x$-containing gases with catalysts comprising a Group VIII iron metal sulfide and a Group VIB metal sulfide, the following experiment was performed.

First and second feed gases of nominal compositions shown in Tables III and IV were fed at a gauge pressure of about 13 inches of water at a rate of 406.0 scc/min (measured at 60° F. and 1 atm.) into a hydrogenation reactor containing 12.18 cc (6.917 gm) of a catalyst consisting of a sulfided composite of 6 wt. % CoO, 12 wt. % $MoO_3$, and 82% of $Al_2O_3$. The operating temperature of the hydrogenation reactor was maintained isothermally at 700° F. The gas space velocity of gases passing through the reactor was about 2000 v/v/hr.

Gases leaving the hydrogenation reactor were cooled to about 75° F., thereby condensing an aqueous solution. The non-condensable off-gas was passed to a sulfuric acid bath to absorb residual ammonia in said off-gas. The gases obtained from the hydrogenation reactor, prior to cooling at 75° F., contained about 20-23 mol % water vapor and were of compositions shown in Tables III and IV.

TABLE III

| Component | Feed (Dry Basis) | Product (Dry Basis) | |
|---|---|---|---|
| | | Range | Average |
| NO, ppmv | 304 | 47 – 75 | 60 |
| $NO_2$, ppmv | 1233 | —0— | —0— |
| $SO_2$, ppmv | 6783 | 1 – 3 | 2 |
| $H_2$, mol % | 1.9176 | 1.28 – 1.36 | 1.32 |
| CO, mol % | 1.2784 | NA | <0.1 |
| $N_2$, mol % | 95.9688 | NA | NA |
| $H_2S$, ppmv | 0.0 | 5296 – 5474 | 5381 |

NA = Not Analyzed

TABLE IV

| Component | Feed (Dry Basis) | Product (Dry Basis) | |
|---|---|---|---|
| | | Range | Average |
| NO, ppmv | 1624 | 34 – 62 | 52 |
| $NO_2$, ppmv | 7 | 0 – 14 | 5 |
| $SO_2$, ppmv | 6781 | —0— | 0 |
| $H_2$, mol % | 2.0702 | 1.67 – 1.73 | 1.71 |
| CO, mol % | 1.3802 | NA | NA |
| $N_2$, mol % | 95.7145 | NA | NA |
| $H_2S$, ppmv | 0.0 | 5112 – 5319 | 5246 |

NA = Not Analyzed

When calculations were made based on data obtained for two specific time periods of each run, including data obtained from analyzing the condensates and acid baths for ammonia, the following average results were tabulated:

TABLE V

| | First Run | Second Run |
|---|---|---|
| Feed[1] | | |
| NO, mg/hr | 7.500 | 40.08 |
| $NO_2$, mg/hr | 46.57 | 0.2649 |
| $NO_x$ as N, mg/hr | 17.67 | 18.784 |
| Product[2] | | |
| NO, mg/hr | 1.318 | 1.527 |
| $NO_2$, mg/hr | —0— | 0.2644 |
| $NO_x$ as N, mg,hr | 0.615 | 0.7932 |
| $NH_3$, mg/hr | 15.76 | 20.48 |
| N in $NH_3$, mg/hr | 12.98 | 16.868 |
| Wt. % Disappearance of $NO_x$ | 96.5 | 95.8 |
| Wt. % Yield of Ammonia[3] | 73.5 | 89.8 |

[1]NO, $NO_2$, and $NO_x$ data for feed gas derived from nominal concentrations shown in Tables III and IV.
[2]NO, $NO_2$, and $NO_x$ for product gas derived from average concentration data for the two specific time periods under investigation in each run. These average data for first run are 53.5 ppmv NO, 0 ppmv $NO_2$, and 53.5 ppmv $NO_x$; for second run, 62 ppmv NO, 7 ppmv $NO_2$, and 69 ppmv $NO_x$.
[3]As (N in $H_3$/N in $NO_x$ in feed) × 100

Based on the data of Table V, removal of $NO_x$ from the feed gas is such that the mass flow rate of $NO_x$ components (as nitrogen) discharged as components of the product gas is less than 5% of the mass flow rate of the $NO_x$ components in the feed gas. Ammonia yields are in excess of 70%.

One of the most critical aspects of the preferred embodiment of the invention resides in the nature of the catalyst utilized in oxidation reactor 18 and incinerator 27. As stated hereinbefore, many catalysts are known in the art which are active for the conversion of $H_2S$ to sulfur and/or $SO_2$, and their use in the invention is therefore contemplated. Generally speaking, these catalysts comprise one or more refractory oxides, such as bauxite, with or without one or more supported active metal components. If an active metal component is utilized, as is generally found necessary for the air oxidation of $H_2S$ to sulfur, they may be selected from such components as the alkali metals, iron, manganese, etc., and the oxides and sulfides of such metals. As contemplated herein, such catalysts are used in oxidation reactor 18 and incinerator 27 as a bed of solid particles.

The preferred catalyst for use in the oxidation reactor 18 and/or incinerator 27 comprises a vanadium oxide and/or sulfide supported on a non-alkaline, porous refractory oxide. Such catalysts are preferred not only because of their high activity for the conversion of $H_2S$ to $SO_2$ and/or sulfur, but also because of their exceedingly long life; some have been used for periods as long as 30 and 90 days with little or no loss in activity being measured. It is fully expected, therefore, that such catalysts will prove operable for time periods of at least one year.

As defined herein, the "non-alkaline" supports utilized in the preferred catalyst are characterized as materials that contain no more than about 4 wt.%, preferably less than about 2 wt.%, of alkali metal or alkaline earth metal compounds, calculated as oxides, which compounds are sufficiently basic to form salts with anionic oxides of the active metal component, e.g., vanadates. Such salt formation is believed to be at least one alkaline-induced transformation leading to rapid deactivation of the catalyst. Sodium zeolites are exemplary of such undesirable basic compounds.

Suitable non-alkaline, porous refractory oxide supports include such refractory oxides as silica, alumina, silica-alumina silica-magnesia, zirconia, silica-zirconia, titania, silica-titania, silica-zirconia-titania, or combinations of the aforementioned materials. Acidic metal phosphates and arsenates such as aluminum phosphate, boron phosphate, chromium phosphate, rare earth phosphate, aluminum arsenate, etc., may also be used, as also may certain amorphous and crystalline aluminosilicate zeolites, including such naturally occurring zeolites as mordenite, erionite, stibite, faujausite, and the like (in their non-alkaline forms). Synthetic forms of these natural zeolites can also be used with success. Synthetic hydrogen "Y" zeolites prepared by ion exchange with an ammonium salt followed by heating to decompose the zeolitic ammonium ion to leave hydrogen ions are particularly contemplated as suitable supports, especially when composited with alumina to produce a support containing about 20–25 wt.% alumina. These hydrogen "Y" zeolites are further characterized by a $SiO_2/Al_2O_3$ mole-ratio preferably in the range of 4:1 to 5:1, but those in the range of 4:1 to 6:1, and even 3.5:1 to 6:1, are also suitable. Preferred crystalline alumino-silicate zeolites, whether natural or synthetic, consist of silica and alumina in a ratio between about 4:1 and 100:1. Especially preferred are those natural and synthetic crystalline aluminosilicate zeolites having a silica-to-alumina ratio between about 6:1 and 100:1, mordenite and erionite, particularly in the hydrogen or decationized forms, being found to be most suitable. In general, zeolitic-supported catalysts, although active for the conversion of $H_2S$ to either $SO_2$ or sulfur, are more preferred for use in incinerator 27 than in oxidation reactor 18.

Because of its stability in the presence of water vapor, alumina is a preferred support for the catalyst used in oxidation reactor 18. Moreover, because of the relatively low temperatures and limited quantities of oxygen (i.e., the stoichiometric amount for the conversion of $H_2S$ to sulfur) present in the gases passing through oxidation reactor 18, the sulfation problems normally associated with the use of alumina-based catalysts in the presence of both $SO_2$ and $O_2$ are avoided, particularly when the feed gas contains no more than about 2 mol % of sulfur components (as sulfur). Thus, unless it is necessary to treat a feed gas containing more than about 2 mol % sulfur components, or to use excess oxidant or temperatures in excess of 450° F., alumina and other sulfatable supports such as silica-magnesia, zirconia, silica-zirconia, titania, silica-titania, silica-zirconia, etc., may be used with success.

The remaining catalyst supports hereinbefore mentioned also have been found to be very stable in the presence of both $SO_2$ and $O_2$, and even in the presence of $SO_3$, and their use in treating feed gases containing more than about 2 mol % of sulfur components is normally feasible, even for time periods in excess of one year, depending upon other process factors. Silica, for example, does not sulfate, but because of its well known susceptibility to decomposition and volatilization in the presence of water vapor, it should not be used in environments wherein the water dew point can exceed about 120° F. Also, silica supported catalysts have been found to be of insufficient activity for producing high conversions of $H_2S$ to sulfur unless the operating pressure is above about 50 psig. Similarly, zeolitic supported catalysts are not subject to deactivation by sulfation, but are not generally as active for the conversion of $H_2S$ to sulfur as those comprising alumina or silica-alumina. When zeolitic catalysts are used in oxidation reactor 18, the gases should be contacted therewith at a temperature in excess of 350° F., at a space velocity below 500 v/v/hr, and at a pressure above about 50 psig.

Silica-alumina supports containing at least 10 wt.% alumina, preferably between about 20 and 30 wt.% alumina, as in high-alumina, commercial cracking catalysts, are most preferred for use in the catalysts of oxidation reactor 18. Such catalysts have been found to combine the advantages of both alumina and silica supports, while losing the disadvantages of each. Specifically, catalysts comprising the described silica-alumina supports are resistant to sulfation and water vapor attack, and are also highly active for the conversion of $H_2S$ to sulfur when utilized under any operating pressure in the range of 0-200 psig.

Preferred catalysts made from any of the foregoing supports comprise about 0.2 to 30 wt.%, preferably 2.0 to 20 wt.%, of a vanadium promoter. Specifically, any oxide and/or sulfide of vanadium will perform satisfactorily. The preferred active metal promoter, however, is vanadium pentoxide ($V_2O_5$) in proportions ranging between about 1 and 30 percent by weight. Especially preferred, however, is a catalyst comprising between 2 and 20 wt.% $V_2O_5$, and more preferably still, between about 5 and 15 wt.% $V_2O_5$.

The preferred vanadium-supported catalyst utilized in the invention may be produced by any method conventionally known in the art. For example, any of the foregoing described supports may be compounded with a vanadium promoter, as by impregnating the support with an ammonium vanadium solution. The resulting paste is then successively dried, extruded or pelleted, and then calcined for several hours. The resulting catalyst may then be reduced. This reduction can be accomplished by pre-reduction with hydrogen. A typical pre-reduction procedure, and one preferred for use herein, comprises passing a mixture of gases consisting of 10 mol % $H_2S$ and 90 mol % $H_2$ at a temperature of about 400° F. and at a space velocity between about 400 and 600 v/v/hr over the catalyst for about 2 hours. In general, pre-reduced catalysts are preferred for use in oxidation reactor 18 and optional in incinerator 27.

The following examples show methods by which vanadium oxide supported catalysts suitable for use in the invention are made.

EXAMPLE III

A 10 wt.% $V_2O_5$ on alumina catalyst suitable for use primarily in oxidation reactor 18 was made as follows: 200 grams of anhydrous $Al_2O_3$ (as hydrated spray-dried alumina) was soaked in a hot solution of 28.5 grams of $NH_4VO_3$ in 500 ml water. The paste formed was dried at 90–100° C., remoistened and extruded through a ⅛ inch die, dried at 110° C., calcined at 932° F. for 3 hours, and then reduced.

This catalyst, when utilized to continuously convert the $H_2S$ in a gas stream comprising about 1.4 mol % $H_2S$ to sulfur for 30 days, showed absolutely no deactivation, with conversions in excess of 95% complete being obtained.

EXAMPLE IV

A 10% $V_2O_5$ on mordenite catalyst (10% $V_2O_5$, 80% mordenite, 10% silica) was made as follows: 600 gm Zeolon, a commercial synthetic sodium mordenite manufactured by the Norton Company, was slurried in 5000 ml of 1.0 N HCl at room temperature for 60 minutes. It was then filtered and the treatment was repeated on the filter cake. The filter cake from the second treatment was slurried in hot 1.0 N HCl (73° C.) for 1 hour, then filtered, and finally washed on the filter with four 1000 ml washes of hot water. After the filter cake was dried, the $Na_2O$ content was 0.57% by weight (about 93% exchanged to the hydrogen form). The hot treatment was repeated twice more for 45 minutes each, after which time the $Na_2O$ level was 0.21% by weight (97.5% exchanged). The amount of aluminum extracted was relatively small so the product had a $SiO_2/Al_2O_3$ ratio of 11.5 compared to the original ratio of 10.

An amount of the dried hydrogen mordenite corresponding to 225 gm of anhydrous powder was mulled together with 424 gm of a silica hydrogel (containing about 6% $SiO_2$ or 25 gm of anhydrous silica) and 36.1 gm of $NH_4VO_3$ (or 27.8 gm of $V_2O_5$). The mixture was dried during mulling with a flow of hot air until it was of extrudable consistency. It was then extruded through a ⅛ inch die, dried, and calcined at 932° F. for 3 hours. The product containing 10% by weight of $V_2O_5$ had excellent physical properties and had a deep golden color. The resulting catalyst was found to be especially useful for incinerating $H_2S$ to $SO_2$.

In an alternative embodiment of the invention, feed gases containing $SO_2$ and/or $SO_3$ as essentially the only sulfur components therein, or as the only sulfur components to be removed therefrom, are passed in part to absorber 31 via line 46 (valve A being open), whereby a purified product gas containing essentially no $SO_2$ or $SO_3$ will be produced in line 38. The remaining portion of the feed gas stream, usually a minor portion thereof, is directed to preheater 2 via lines 1 or 1a to be treated as hereinbefore described. Preferably, the proportion of the feed gas fed to preheater 2 is that necessary to provide an $H_2S$ concentration in the product gas-oxidant mixture carried in line 17 of no more than 10 mol % (dry basis), and most preferably no more than 5 mol %. This insures that no temperature control difficulties will be encountered in oxidation reactor 18; it also insures that the conversion of $H_2S$ to sulfur in oxidation reactor 18 will be in excess of 50% complete, preferably 70% complete, so that in excess of 50% of the sulfur components in line 19 can be removed as condensed sulfur, thereby preventing a continuous increase in the concentration of dissolved $SO_2$ and $SO_3$ in absorber 31 to levels in excess of their solubility limit. Also, the overall removal of $SO_2$ and $SO_3$ from the feed gas on a weight per hour basis is such that the amount of $SO_2$ plus $SO_3$ components discharged via line 38 will be less than 10%, usually less than 5%, and most usually less than 2%, of that amount fed as components of the feed gas.

The embodiment just described will be found useful for treating stack gases and the like, which usually contain no more than about 5 vol.% of $SO_2 + SO_3$ and about 10 mol % water vapor. Numerous advantages are obtained when such feed gases are so treated. First, it will be seen that advantage is taken of the highly effective means for removing $SO_2$ provided by absorber 31 (for gases entering from both line 30 and line 46) so that the other equipment necessary for the process of the invention can be sized to treat a much smaller stream of gas. Second, because stack gases normally contain about 10 mol % water vapor, the foul water removed via line 12 as hereinbefore described may be fed directly into the gas stream entering preheater 25, thereby removing the necessity for purchasing a stripping unit. Third, stack gases usually also contain nitrogen oxide ($NO_x$) components, and in the process of removing $SO_2$ and $SO_3$ as hereinbefore described, a substantial proportion of $NO_x$ components is also removed. Some are removed in absorber 31 by dissolution and/or reaction with the liquid medium therein to be ultimately carried to hydrogenation reactor 9 via line 3. Some are passed directly to hydrogenation reactor 9 via lines 1 or 1a, there to be removed with the $NO_x$ components from line 3 according to Reactions VIII and IX. Thus, the mass flow rate of $NO_x$ components discharged as components of the purified product gas in line 38 will be substantially less than the mass flow rate of the $NO_x$ components carried as components in the stack gas. Lastly, since only a minor portion of the stack gas is fed into preheater 2, only that amount of fuel necessary to deplete the oxygen in this minor portion of the stack gas stream need be burned in the preheater.

The foregoing embodiment will be found most useful for treating stack gases containing $SO_2$ as the only sulfur component contained therein. In addition to the aforementioned advantages, passing such stack gases through absorber 31 will, when containing less than about 1.0 mol % oxygen, not produce ammonium sulfates in the absorbent solution. As a result, the liquid in stream 3 may be completely vaporized at some temperature less than about 800° F. and essentially no ammonia loss via Reaction XIV will be encountered.

It should also be noted that feed gases from which $SO_2$ and/or $SO_3$ are to be primarily removed may be directed exclusively via line 46 to the absorber 31, with none being introduced into the preheater via lines 1 or 1a. This embodiment is especially useful for treating gases containing less than about 1 mol % of $SO_2$ plus $SO_3$. When treating feed gases in this manner, it will usually be found that the combustion of the fuel with air in preheater 2 will provide not only sufficient reactants for the conversion to $H_2S$ of the non-$H_2S$ sulfur components introduced into preheater 2 from line 3 (i.e., mostly dissolved $SO_2$ and $SO_3$ with traces of other sulfur components), but also sufficient diluent gases to insure that the gases passing into oxidation reactor 18 will contain less than 10 mol % $H_2S$. An advantage inherent in this embodiment lies in the fact that the proportion of oxygen in the preheater flue gas is more easily controlled because oxygen enters the preheater from only one source, line 5. Any oxygen present in the feed gas is simply removed from the absorber as a component of the purified product gas. Also, as with the previously described embodiment, this embodiment is most advantageously employed when the feed gas contains no $SO_3$ and no more than about 1.0 mol % oxygen, thereby allowing for the vaporization of liquid in line 3 at a temperature in the 200–800° F. range with essentially no loss of ammonia. Lastly, it is possible in this embodiment, to treat a feed gas containing particulates; hoeever, some means must be made available to prevent these particulates from entering hydrogenation reactor 9. One such means would be to incorporate a filter (not shown) in line 3, thereby preventing carry-over of solids from absorber 31 to reactor 9.

Although the invention has been described in conjunction with specific embodimens thereof, it is evident that many alterations, modifications, and variations will be apparent to those skilled in the art in light of the foregoing description. Accordingly, it is intended to embrace all such alternatives, modifications, and variations that fall within the spirit and scope of the appended claims.

I claim:
1. A process for the desulfurization of a feed gas stream containing one or more sulfur components selected from the class consisting of $SO_2$, COS, $CS_2$, $SO_3$, light mercaptans, and sulfur vapor, which process comprises the steps of:
   (1) hydrogenating sufficient of the $SO_2$, $SO_3$, light mercaptans, and sulfur vapor components and/or hydrolyzing sufficient of the $CS_2$ and COS components contained in a mixed gas stream comprising said feed gas stream and a vaporized bleed stream recycled from step (7) hereinafter such that, by reaction with sufficient of one or more components selected from the class consisting of $H_2$, CO plus water vapor, and water vapor, at least about 80% of the non-$H_2S$ sulfur components in the mixed gas stream are converted to $H_2S$;
   (2) contacting at a temperature in excess of 250° F. a mixture of product gas withdrawn from step (1) and a gaseous oxidant comprising oxygen and/or $SO_2$ with a solid oxidation catalyst so as to oxidize in excess of 50% of the $H_2S$ contained in said product gas to elemental sulfur;
   (3) separating free sulfur from the gases produced in step (2), thereby obtaining an off-gas stream containing residual $H_2S$;
   (4) oxidizing with sufficient oxygen at least 90% of the residual $H_2S$ in said off-gas stream to $SO_2$;
   (5) absorbing essentially all of the $SO_2$ in the $SO_2$-containing gas obtained in step (4) in an aqueous solution maintained at a pH between about 3.0 and about 6.6, said aqueous solution comprising a component selected from the class consisting of ammonia, soluble amines, ammonium compounds, and combinations thereof;
   (6) withdrawing from step (5) a liquid bleed stream containing absorbed $SO_2$;
   (7) vaporizing said bleed stream and recycling vapors so produced to step (1); and
   (8) discharging from step (5) a purified product gas stream essentially free of sulfur components including $H_2S$.
2. A process comprising

(1) contacting at a temperature in the range of 300°–800° F. a mixed gas stream comprising a feed gas stream containing one or more sulfur components selected from the class consisting of $SO_2$, COS, $CS_2$, $SO_3$, light mercaptans, and sulfur vapor, said mixed gas stream also containing one or more $H_2$, CO, and water vapor components in proportions sufficient to convert at least 80% of the non-$H_2S$ sulfur components in said mixed gas stream to $H_2S$, said mixed gas stream further containing no more than about 0.1 mol % oxygen, with a catalyst comprising a Group VIB metal sulfide and an iron group metal sulfide at a space velocity correlated with temperature so as to convert at least 80% of said non-$H_2S$ sulfur components to $H_2S$;

(2) dehydrating the product gas produced in step (1) to a water vapor content of less than about 15 vol. %;

(3) contacting at a temperature in excess of 250° F. a mixture of dehydrated product gas obtained in step (2) and a gaseous oxidant comprising oxygen with a catalyst comprising a vanadium oxide and/or sulfide supported on a non-alkaline porous refractory oxide, said contacting being carried out at a space velocity correlated with temperature so as to oxidize at least 70% of the $H_2S$ contained in said dehydrated product gas to elemental sulfur;

(4) separating from the gases produced in step (3) free sulfur and an off-gas stream containing residual $H_2S$;

(5) contacting at a temperature in excess of 300° F. a mixture of said off-gas stream and a gaseous oxidant comprising oxygen with a catalyst comprising a vanadium oxide and/or sulfide supported on a non-alkaline, porous refractory oxide at a space velocity correlated with temperature so as to oxidize at least 90% of said residual $H_2S$ to $SO_2$;

(6) absorbing essentially all of said $SO_2$ in an $SO_2$-containing gas stream obtained from step (5) in an aqueous ammonia solution maintained at a pH between about 3.0 and about 6.6;

(7) withdrawing from step (6) a liquid bleed stream containing absorbed $SO_2$;

(8) vaporizing said bleed stream and recycling vapors so produced to step (1), said vapors then becoming components of said mixed gas stream; and (9) discharging from step (6) a purified product gas stream essentially free of sulfur components including $H_2S$.

3. A process as defined in claim 2 wherein (a) said feed gas also contains $H_2S$ as a sulfur component and (b) sufficient non-$H_2S$ sulfur components are converted to $H_2S$ in step (1) and sufficient $H_2S$ is converted to elemental sulfur in step (3) and $SO_2$ in step (5) that the mass flow rate of sulfur components (as sulfur) discharged as components of said purified product gas stream of step (9) is less than 5% of the mass flow rate of the sulfur components carried in said feed gas stream.

4. A process as defined in claim 3 wherein said catalyst of step (1) comprises cobalt sulfide, molybdenum sulfide, and alumina, and the catalysts of steps (3) and (5) comprise between about 1 and 30 wt. % $V_2O_5$ supported on a non-alkaline, porous refractory oxide selected from the class consisting of alumina, silica, silica-alumina, hydrogen mordenite, hydrogen "Y" zeolite, acidic metal phosphates and arsenates, and combinations thereof.

5. A process as defined in claim 4 wherein said catalyst of step (3) comprises a support consisting of silica-alumina, said support consisting of between about 20 and 30 wt. % alumina, and said catalyst of step (5) comprises a support consisting of hydrogen mordenite.

6. A process as defined in claim 3 wherein the mass flow rate of gaseous sulfur components (as sulfur) discharged as components of the purified product gas stream from step (9) is less than 2% of the mass flow rate of the sulfur components carried in said feed gas stream.

7. A process as defined in claim 3 wherein the mass flow rate of $H_2S$ (as sulfur) discharged as a component of the purified product gas stream from step (9) is less than 0.1% of the mass flow rate of the gaseous sulfur components (as sulfur) carried as components of the feed gas stream.

8. A process as defined in claim 3 wherein essentially no $SO_3$ is produced in step (5) and said $SO_2$-containing gas stream in step (6) contains no more than about 1.0 mol % oxygen.

9. A process as defined in claim 8 wherein said vaporizing of step (8) is carried out at a temperature less than 800° F.

10. A process as defined in claim 9 wherein said mixture of off-gas stream and oxidant in step (5) contains at least about 0.5 mol % hydrogen.

11. A process as defined in claim 3 wherein said feed gas stream contains $NO_x$ components and the mass flow rate of the $NO_x$ components in the purified product gas stream from step (9) is substantially less than the mass flow rate of the $NO_x$ components in said feed gas stream.

12. A process for the desulfurization of a feed gas stream containing one or more sulfur components selected from the class consisting of $SO_2$ and $SO_3$, which process comprises the steps of:

(1) dividing said feed gas stream into first and second feed gas streams;

(2) hydrogenating sufficient of the $SO_2$ plus $SO_3$ components contained in a mixed gas stream comprising said first feed gas stream such that, by reaction with sufficient of one or more components selected from the class consisting of $H_2$, CO plus $H_2O$, and combinations thereof, at least about 80% of the $SO_2$ plus $SO_3$ components in the mixed gas stream are converted to $H_2S$;

(3) contacting at a temperature in excess of 250° F. a mixture of product gas withdrawn from step (2) and a gaseous oxidant comprising oxygen and/or $SO_2$ with a solid oxidation catalyst so as to oxidize in the gas phase in excess of 50% of the $H_2S$ contained in said product gas to elemental sulfur;

(4) separating from the gases produced in step (3) free sulfur and an off-gas stream containing residual $H_2S$;

(5) oxidizing with sufficient oxygen at least 90% of the residual $H_2S$ in said off-gas stream to $SO_2$;

(6) removing essentially all of the $SO_2$ in an $SO_2$-containing gas stream obtained in step (5) and essentially all of the $SO_2$ and $SO_3$ in said second feed gas stream by passing both of said gas streams through an aqueous absorption solution maintained at a pH between about 3.0 and about 6.6, said aqueous solution comprising a component selected from the class consisting of ammonia, soluble amines, ammonium compounds, and combinations thereof;

(7) withdrawing from step (6) a liquid bleed stream containing absorbed $SO_2$ and/or $SO_3$;

(8) vaporizing said bleed stream and recycling vapors so produced to step (2), said vapors then becoming components of said mixed gas stream; and (9) discharging from step (6) a purified product gas stream essentially free of $SO_2$, $SO_3$, and $H_2S$.

13. A process for desulfurizing a feed gas stream containing one or more sulfur components selected from the class consisting of $SO_2$ and $SO_3$ comprising:

(1) dividing said feed gas stream into first and second feed gas streams;

(2) removing essentially all oxygen from said first feed gas stream;

(3) contacting at a temperature in the range 300°–800° F. a mixed gas stream comprising said first feed gas stream and a vaporized bleed steam recycled from step (10) herein, said mixed gas stream also containing one or more $H_2$ and/or CO plus water vapor components in proportions sufficient to convert at least 80% of the $SO_2$ plus $SO_3$ components in said mixed gas stream to $H_2S$, with a catalyst comprising a Group VIB metal sulfide and an iron group metal sulfide at a space velocity correlated with temperature so as to convert at least 80% of the $SO_2$ plus $SO_3$ components in said mixed gas stream to $H_2S$;

(4) dehydrating the product gas produced in step (3) to a water vapor content of less than 15 vol. %;

(5) contacting at a temperature in excess of 250° F. a mixture of dehydrated product gas obtained in step (4) and a gaseous oxidant comprising oxygen with a catalyst comprising a vanadium oxide and/or sulfide supported on a non-alkaline porous refractory oxide, said contacting being carried out at a space velocity correlated with temperature so as to oxidize at least 70% of the $H_2S$ contained in said dehydrated product gas to elemental sulfur;

(6) separating from the gases produced in step (5) free sulfur and an off-gas stream containing residual $H_2S$;

(7) contacting at a temperature in excess of 300° F. a mixture of said off-gas stream and a gaseous oxidant comprising oxygen with a catalyst comprising a vanadium oxide and/or sulfide supported on a non-alkaline, porous refractory oxide at a space velocity correlated with temperature so as to oxidize at least 90% of said residual $H_2S$ to $SO_2$;

(8) removing essentially all of the $SO_2$ in the $SO_2$-containing gas stream obtained from step (7) and essentially all of the $SO_2$ and $SO_3$ in said second feed gas stream by passing both of said streams through a liquid absorber medium comprising an aqueous ammonia solution maintained at a pH between 3.0 and about 6.6;

(9) withdrawing from step (8) a liquid bleed stream containing absorbed $SO_2$ and/or $SO_3$;

(10) vaporizing said bleed stream and recycling vapors so produced to step (3); and

(11) discharging from step (8) a purified product gas stream essentially free of $SO_2$, $H_2S$ and $SO_3$.

14. A process as defined in claim 13 wherein sufficient $SO_2$ plus $SO_3$ components are converted $H_2S$ in step (3) and sufficient $H_2S$ converted to sulfur in step (5) and $SO_2$ in step (7) that the mass flow rate of $SO_2$ plus $SO_3$ (as sulfur) discharged as components of said purified product gas stream of step (11) is less than 5% of the mass flow rate of the $SO_2$ plus $SO_3$ components carried in said feed gas stream.

15. A process as defined in claim 14 wherein the feed gas stream contains $NO_x$ components and the mass flow rate of the $NO_x$ components in the purified product gas stream from step (11) is substantially less than the mass flow rate of the $NO_x$ components in said feed gas stream.

16. A process for the desulfurization of a feed gas stream containing one or more sulfur components selected from the class consisting of $SO_2$ and $SO_3$, which process comprises the steps of:

(1) passing said feed gas stream through an aqueous absorption solution of pH between about 3.0 and about 6.6, said solution comprising a component selected from the class consisting of ammonia, soluble amines, ammonium compounds, and combinations thereof, so as to remove essentially all of the $SO_2$ and $SO_3$ contained in said feed gas stream;

(2) withdrawing from step (1) a liquid bleed stream containing absorbed $SO_2$ and/or $SO_3$;

(3) vaporizing said bleed stream and hydrogenating sufficient of the $SO_2$ and $SO_3$ components contained in the produced vapors such that, by reaction with sufficient of one or more components selected from the class consisting of $H_2$, CO plus $H_2O$, and combinations thereof, at least about 80% of the $SO_2$ plus $SO_3$ components in said vaporized stream are converted to $H_2S$;

(4) contacting at a temperature in excess of 250° F. a mixture of product gas withdrawn from step (3) and a gaseous oxidant comprising oxygen and/or $SO_2$ with a solid oxidation catalyst so as to oxidize in the gas phase in excess of 50% of the $H_2S$ contained in said product gas to elemental sulfur;

(5) separating from the gases produced in step (4) free sulfur and an off-gas stream containing residual $H_2S$;

(6) oxidizing with sufficient oxygen at least 90% of the residual $H_2S$ in said off-gas stream to $SO_2$;

(7) passing an $SO_2$-containing gas stream obtained in step (6) into the absorption solution of step (1), thereby absorbing essentially all of said $SO_2$ in said absorber solution; and (8) discharging from step (1) a purified product gas stream essentially free of $SO_2$, $H_2S$, and $SO_3$ components.

17. A process for the desulfurization of a feed gas stream containing one or more sulfur components selected from the class consisting of $SO_2$ and $SO_3$, which process comprises the steps of:

(1) passing said feed gas stream through an aqueous absorption solution maintained at a pH between about 3.0 and about 6.6, said aqueous solution comprising a component selected from the class consisting of ammonia, soluble amines, ammonium compounds, and combinations thereof, so as to remove essentially all of the $SO_2$ and $SO_3$ contained in said feed gas stream;

(2) withdrawing from step (1) a liquid bleed stream containing absorbed $SO_2$ and/or $SO_3$;

(3) vaporizing said bleed stream and blending therewith one or more $H_2S$ and/or CO plus water vapor components in proportions sufficient to convert at least 80% of the $SO_2$ plus $SO_3$ components in the resulting mixed gas stream to $H_2S$ in step (4) hereinafter, said mixed gas stream containing no more than about 0.1 mol % oxygen;

(4) contacting said mixed gas stream at a temperature in the range 300°–800° F. with a catalyst comprising a Group VIB metal sulfide and an iron group metal sulfide at a space velocity correlated with temperature so as to convert at least 80% of the $SO_2$ plus $SO_3$ components in said mixed gas stream to $H_2S$;

(5) dehydrating the product gas produced in step (4) to a water vapor content of less than 15 vol. %;

(6) contacting at a temperature in excess of 250° F. a mixture of dehydrated product gas obtained in step (5) and a gaseous oxidant comprising oxygen with a catalyst comprising a vanadium oxide and/or sulfide supported on a non-alkaline porous refractory oxide, said contacting being carried out at a space velocity correlated with temperature so as to oxidize at least 70% of the $H_2S$ contained in said dehydrated product gas to elemental sulfur;

(7) separating from the gases produced in step (6) free sulfur and an off-gas stream containing residual $H_2S$;

(8) contacting at a temperature in excess of 300° F. a mixture of said off-gas stream and a gaseous oxidant comprising oxygen with a catalyst comprising a vanadium oxide and/or sulfide supported on a non-alkaline, porous refractory oxide at a space velocity correlated with temperature so as to oxidize at least 90% of said residual $H_2S$ to $SO_2$;

(9) passing an $SO_2$-containing gas stream obtained in step (8) into the absorption solution of step (1), thereby absorbing essentially all of said $SO_2$ in said absorption solution; and

(10) discharging from step (1) a purified product gas stream essentially free of $SO_2$, $H_2S$, and $SO_3$.

18. A process as defined in claim 17 wherein sufficient $SO_2$ plus $SO_3$ components are converted to $H_2S$ in step (4) and sufficient $H_2S$ converted to sulfur in step (6) and $SO_2$ in step (8) that the mass flow rate of $SO_2$ plus $SO_3$ components (as sulfur) discharged as components of said purified product gas stream of step (10) is less than 5% of the mass flow rate of the $SO_2$ plus $SO_3$ components carried in said feed gas stream.

19. A process as defined in claim 18 wherein said catalyst of step (4) comprises cobalt sulfide, molybdenum sulfide, and alumina, and the catalysts of steps (6) and (8) comprise between about 1 and 30 wt.% $V_2O_5$ supported on a non-alkaline, porous refractory oxide selected from the class consisting of alumina, silica, silica-alumina, hydrogen mordenite, hydrogen "Y" zeolite, acidic metal phosphates and arsenates, and combinations thereof.

20. A process as defined in claim 19 wherein said catalyst of step (6) comprises a support consisting of silica-alumina, said support consisting of between about 20 and 30 wt.% alumina, and said catalyst of step (8) comprises a support consisting of hydrogen mordenite.

21. A process as defined in claim 19 wherein the mass flow rate of $SO_2$ plus $SO_3$ components (as sulfur) discharged as components of said purified product gas stream in step (10) is less than 2% of the mass flow rate of the $SO_2$ plus $SO_3$ components in said feed gas stream.

22. A process as defined in claim 17 wherein the feed gas stream contains $NO_x$ components and the mass flow rate of the $NO_x$ components in the purified product gas stream from step (10) is substantially less than the mass flow rate of the $NO_x$ components in said feed gas stream.

23. A process as defined in claim 17 wherein (a) said sulfur components in said feed gas consist essentially of $SO_2$ (b) no $SO_3$ is produced in step (8), and (c) said $SO_2$-containing gas stream in step (9) contains no more than about 1.0 mol % oxygen.

24. A process as defined in claim 23 wherein said vaporizing of step (3) is carried out at a temperature less than 800° F.

25. A process as defined in claim 24 wherein said mixture of off-gas stream and oxidant in step (8) contains at least about 0.5 mol % hydrogen.

* * * * *